(12) United States Patent
Kasprzak et al.

(10) Patent No.: US 8,700,939 B2
(45) Date of Patent: Apr. 15, 2014

(54) METHODS AND SYSTEMS FOR PROVIDING INDIRECT VOLTAGE DETECTION IN A POWER SUPPLY

(75) Inventors: Keith Kasprzak, Cedar Park, TX (US); Daniel B. Little, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 895 days.

(21) Appl. No.: 12/432,748

(22) Filed: Apr. 30, 2009

(65) Prior Publication Data

US 2010/0281284 A1 Nov. 4, 2010

(51) Int. Cl.
*G06F 1/00* (2006.01)

(52) U.S. Cl.
USPC .......................................................... 713/340

(58) Field of Classification Search
USPC ................................................ 713/300, 340
See application file for complete search history.

(56) References Cited

U.S. PATENT DOCUMENTS

| | | | |
|---|---|---|---|
| 6,201,723 B1 | 3/2001 | Farmington | |
| 6,628,014 B2* | 9/2003 | Borup | 307/103 |
| 6,774,612 B1* | 8/2004 | Ballenger et al. | 323/303 |
| 6,954,054 B2* | 10/2005 | Brown | 323/283 |
| 7,541,793 B2* | 6/2009 | Saeueng et al. | 323/284 |
| 7,629,711 B2* | 12/2009 | Zhong et al. | 307/103 |
| 7,928,689 B2* | 4/2011 | Kawamoto et al. | 320/106 |
| 2002/0196004 A1* | 12/2002 | Berson et al. | 323/282 |
| 2003/0202364 A1* | 10/2003 | Lomax et al. | 363/21.09 |
| 2004/0174146 A1* | 9/2004 | Leman | 323/266 |
| 2005/0018457 A1* | 1/2005 | Iwashita | 363/95 |
| 2005/0029998 A1* | 2/2005 | Brachmann et al. | 323/283 |
| 2006/0267563 A1* | 11/2006 | Belson et al. | 323/266 |
| 2007/0279954 A1* | 12/2007 | Garrett et al. | 363/91 |
| 2007/0297018 A1* | 12/2007 | Bangham et al. | 358/452 |
| 2009/0074110 A1* | 3/2009 | Vorenkamp | 375/317 |

* cited by examiner

*Primary Examiner* — Nimesh G Patel
(74) *Attorney, Agent, or Firm* — Baker Botts L.L.P.

(57) ABSTRACT

A method is provided for providing indirect voltage detection in a power supply of an IHS. The method may include providing output current and voltage to an IHS via a power cable and monitoring the output current within the power supply. Furthermore, the method may include adjusting the output voltage if the output current reaches a threshold value.

17 Claims, 4 Drawing Sheets

METHODS AND SYSTEMS FOR PROVIDING INDIRECT VOLTAGE DETECTION IN A POWER SUPPLY

TECHNICAL FIELD

The present disclosure relates generally to the field of information handling systems, and more specifically, a power management framework external to information handling systems.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For IHSs to function properly, a power supply may be needed to supply power to the IHS and its components. For portable IHSs such as laptops, notebooks, personal display assistants (PDA), and/or the like, an external power supply may be employed. Furthermore, the external power supplies may be AC adapters, which may convert alternating current (AC) signals into direct current (DC) signals for consumption by the portable IHS. To this end, external power supplies (i.e., AC adapters) for portable IHSs may include a power cable that extends from the adapter to pass DC signals to the portable IHS.

In some cases, the power cable may be relatively thick, thereby hindering portability of the external power supply. Moreover, a thick cable may not be aesthetically pleasing to a user or owner of a portable IHS. Therefore, thinner gauge cable may be employed to reduce the thickness of the DC cord. However, using thinner gauge cable may increase the voltage drop along the cable as opposed to a thicker cable. The voltage drop may refer to a decrease in voltage from the voltage initially output by the power supply to the voltage eventually received by the IHS. Notably, the voltage drop associated with any cable may be attributed inherent impedances possessed by the cable.

To account for the voltage drop along the power cable, current solutions may employ voltage detection capabilities to detect the voltage at the IHS. Then, such information may be fed back to the external power supply, and the power supply may then output a higher voltage to compensate for the voltage drop along the power cable. As a result, the voltage eventually received by the IHS may be sufficient for operation. However, in order to implement voltage detection at the IHS, typical solutions employ extra wires to provide communication or feedback between the power supply and the IHS. Providing these extra wires may result in a need to increase the size of the power cable, which again may affect portability and aesthetics.

Thus, a need exists for methods and systems for a power management framework that provides voltage detection of the IHS without the need for extra wires.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method for providing indirect voltage detection in a power supply of an IHS. The method may include providing output current and voltage to an IHS via a power cable, monitoring the output current within the power supply, and adjusting the output voltage if the output current reaches a threshold value.

Another aspect of the disclosure provides for a power management framework external to an information handling system. The framework may include a sense resistor operable to monitor an output current to the IHS and a resistor network. Furthermore, a controller may be coupled to the sense resistor and resistor network. Additionally, the controller may be operable to adjust an output voltage if the output current reaches a threshold value.

Yet another aspect of the disclosure provides for a method for providing indirect voltage detection in a power supply. The method may include providing an output current and voltage to an IHS via a power cable and calculating a voltage drop across the power supply by measuring the output current and a known impedance of the power cable. The method may also include adjusting the output voltage if the output current reaches a threshold value.

Yet another aspect of the disclosure provides a computer-readable medium having computer-executable instructions for performing a method for providing indirect voltage detection in a power supply of an IHS. The method may include providing output current and output voltage to an IHS via a power cable, monitoring the output current within the power supply, and adjusting the output voltage if the output current reaches a threshold value.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems and methods are described, it is to be understood that this disclosure is not limited to the particular systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a power component" refers to one or several power components and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
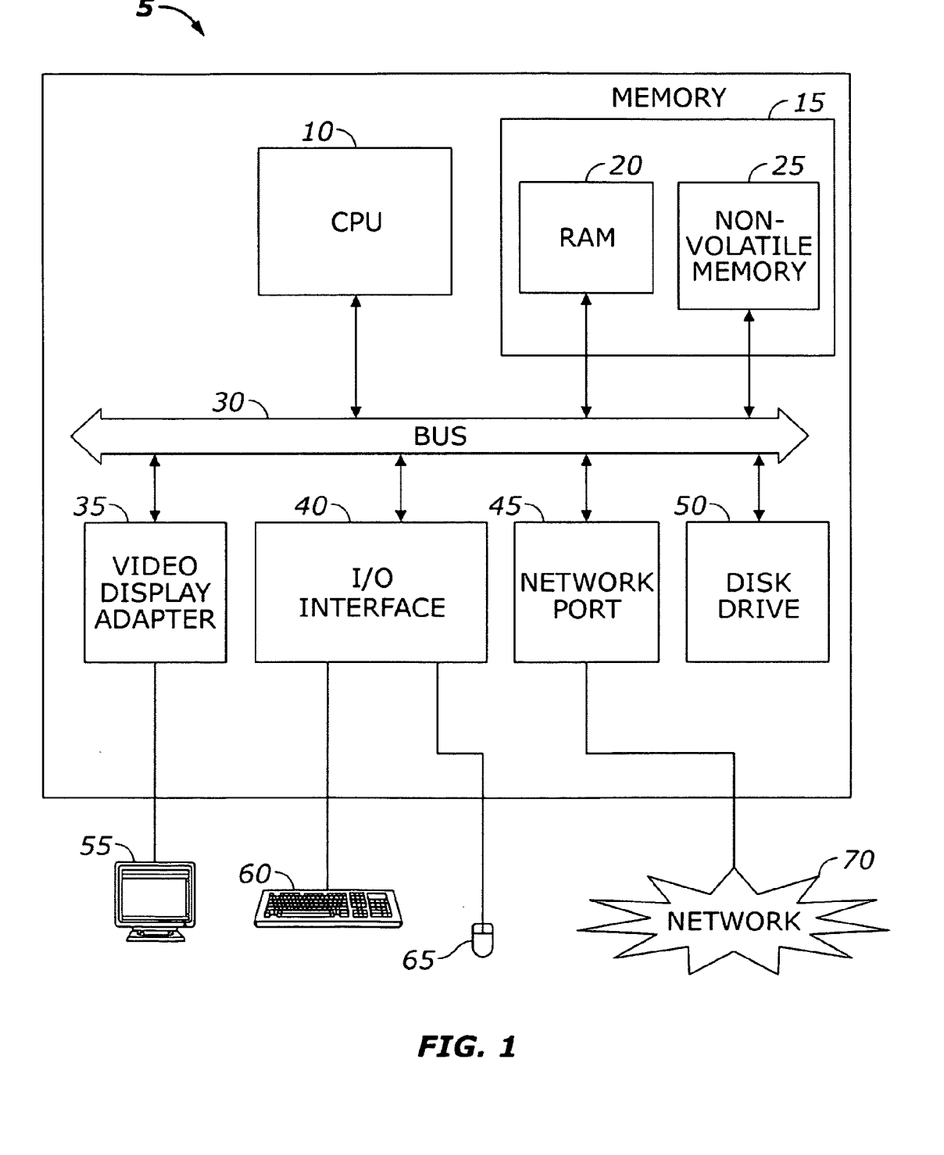
FIG. 1 represents an information handling system (IHS) in accordance with one aspect of the present disclosure.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The system memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The system memory 15 may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
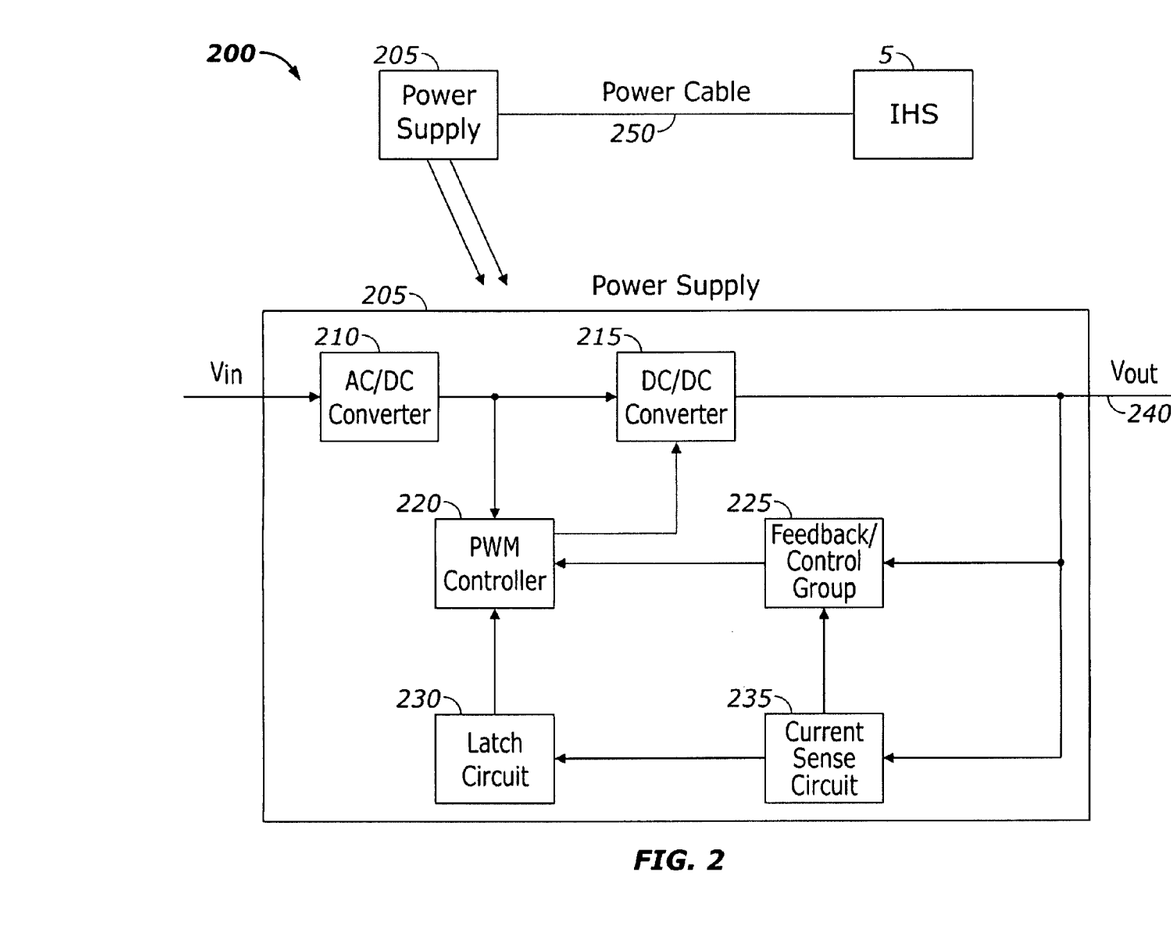
FIG. 2 represents a power supply in accordance with one aspect of the present disclosure.

With respect now to FIG. 2, a schematic of a power supply 205 is provided in accordance with one aspect of the present disclosure. Generally, the power supply 205 may be coupled to the IHS 5 via a power cable 250. As such, the power cable 250 may be operable to house various wires coupling the power supply 205 to the IHS 5. These wires may be operable to deliver an output current and an output voltage (Vout) 240 from the external power supply 205 to the IHS 5. Furthermore, depending on the thickness of the power cable 250, the power cable may have a certain impedance value (i.e., resistivity to electrical current). Generally, the thicker the power cable 250, the less impedance the cable may possess (i.e., the cable may be less resistant to electrical current).

Additionally, in one implementation, the power supply 205 may be an external power supply or adapter for providing power to a portable IHS such as a notebook, personal display assistant (PDA), and/or any other portable device. The external power supply may also have a power cable 250 coupling the external power supply to the IHS 5.

Furthermore, the power supply 205 may include an alternating current to direct current (AC/DC) converter 210 and a DC/DC converter 215. It should be noted that means for implementing both components are well known in the art and would be understood by one of ordinary skill. Similarly, the pulse width modifier (PWM) controller 220, latch circuit 230, and current sense circuit 235 are also well known components used in a power supply 205. Therefore, a brief description will now be given in relation to their general functions.

The AC/DC 210 converter may be operable to convert an input AC voltage, such as is supplied from a wall outlet, for example, to a DC voltage. This DC voltage, however, may be too large or small depending on the requirements of the IHS 5. Therefore, the DC voltage output from the AC/DC converter 210 may be further altered or regulated through a DC/DC converter 215 to a different DC voltage usable by various IHS 5 components (e.g., memory, processor(s), and any other device).

The PWM controller 220 may be employed to maintain the DC voltage output by the DC/DC converter at a constant level. To this end, the PWM controller 220 may include a power switch (not pictured) that may be continuously switched between an ON state and an OFF state to maintain a stable output voltage 240. Furthermore, such switching may be performed according to a duty ratio, which may refer to the percentage of time that the power switch is configured to be in an ON state versus an OFF state. In addition, in order to maintain certain efficiencies within the power supply 205, the PWM controller 220 may vary the duty ratio of the power switch in response to the current demand of the IHS 5. For example, the duty ratio may be increased as the current demand from the IHS 5 increases and decreased as the current demand decreases. Thus, during times of relatively lower current demand, less energy may be used and wasted.

The current demand of the IHS may change depending on the number of components actively operating in response to performing a certain task. For example, an IHS simply in an idle state or performing relatively low CPU-intensive tasks such as web browsing or document editing may demand a relatively low amount of current and thus, may exhibit low current demand. In contrast, CPU intensive tasks, such as playing graphics intensive games, calculating complex algorithms, and/or the like may require a relatively higher amount of current and have a higher current demand.

The current sense circuit 235 may be coupled to the output of the power supply 205 and may be operable to monitor the output current of the power supply 205. In some implementations, the current sense circuit 235 may be operable to detect an overcurrent and switch off the power supply 205 via a latch circuit 230. An overcurrent may occur when an output current is larger than the power supply 205 and/or IHS 5 is designed to handle. Additionally, the current sense circuit 235 may be operable to communicate with the feedback control loop 225 and the latch circuit 230 in case of an overcurrent.

Generally, the feedback control loop 225 may be employed to adjust for a voltage drop across the power cable 250. Indeed, because the power cable 250 may possess its own inherent impedance or resistance, the voltage experienced by the load (i.e., any device that receives current from the power supply 205, such as the IHS 5) may be lower than the output voltage 240 of the power supply 205. To account for a possible voltage drop, the feedback control loop 225 may be operable to adjust a reference voltage to the PWM controller 220. The PWM controller 220 may use the reference voltage to determine the necessary output voltage 240 for the power supply 205 such that the voltage experienced by the IHS 5 falls within the voltage requirements of the IHS 5. Therefore, to account for a voltage drop along the power cable 250, the power supply 205 may produce a relatively higher output voltage 240 with respect to the requirements of the IHS 5. To this end, the output current and the impedance of the power cable 250 may be used to calculate the voltage drop along the power cable 250. As such, the output current of the power supply 205 may be monitored by the current sense circuit 235, and the reference voltage provided by the feedback control loop 225 may be adjusted according to the fluctuations in the output current, the details of which are discussed below in FIG. 3.

Figure 3:
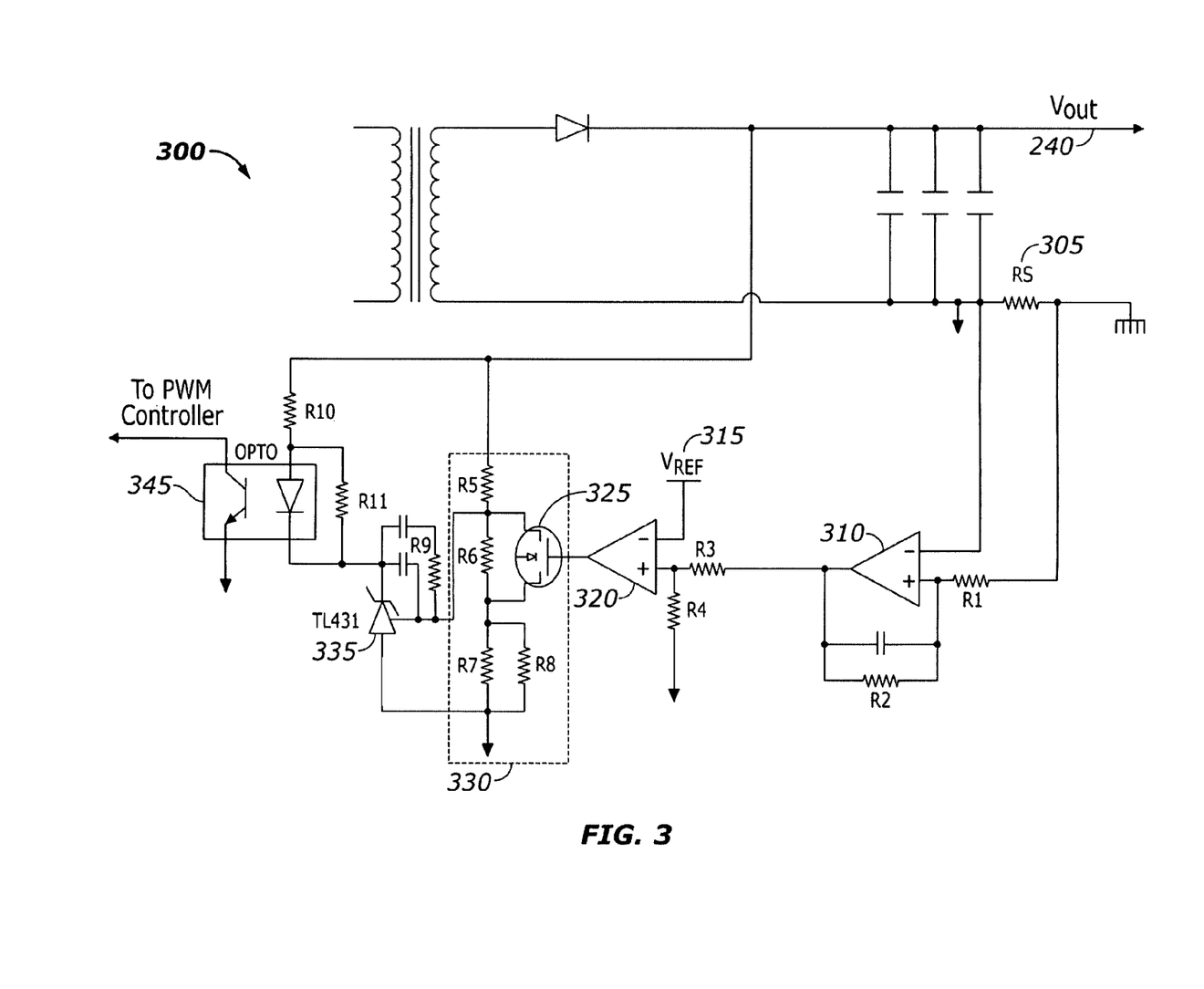
FIG. 3 represents a power management framework within the power supply of FIG. 2.

FIG. 3 provides a schematic of a power management framework 300 in accordance with one aspect of the present disclosure. The power management framework 300 may correspond to detailed circuitry regarding the feedback control loop, PWM controller, and current sense circuit as depicted in FIG. 2 and may thus be located within the power supply. As such, the output voltage (Vout) 240 of the power management framework 300 may be the same output voltage 240 of the power supply in FIG. 2. Furthermore, the output voltage 240 may be differentiated from the voltage "at a load" or "at the IHS," which may refer to the voltage received or experienced by the load and/or IHS.

Furthermore, the power management framework 300 may provide an indirect voltage detection capability for the power supply. Voltage detection may refer to the ability of the power supply to detect the voltage at a load for comparison against the output voltage of the power supply. In some instances, voltage detection of a remote device, such as an IHS, may be referred to as remote sense. Such a capability may be useful in detecting a voltage drop along a power cable from the power supply to the load. Typically, voltage detection in a power supply may be implemented by coupling feedback wires from the load back to the power supply in parallel to power supply output wires. Thus, the feedback wires may detect voltage drops along the power cable to the load by monitoring the difference between the output voltage 240 of the power supply and the voltage measured at the load. Accordingly, the power supply may compensate its output voltage to account for any detected voltage drops and maintain a constant voltage at the load as required by the load.

However, providing for such feedback wires in conventional voltage detection architectures may necessitate a thicker power cable to house the extra feedback wires in addition to output wires, and/or any other wires. In the case of external power supplies, such as an AC adaptor for a notebook, a thicker cable may prove especially cumbersome and affect portability. Furthermore, thicker cables may not be as aesthetically pleasing to a user as thinner cables. Therefore, the power management framework 300 may provide for an indirect voltage detection functionality without the need for extra feedback wires from the load back to the power supply. Thus, the power management framework 300 that may provide detection of voltage drops along a power cable and adjustment(s) to the output voltage 240 accordingly without the need for extra feedback wires.

In implementing an indirect voltage detection, the power management framework 300 may include a sense resistor (Rs) 305 operable to monitor the output current of the power supply. In one implementation, Rs 305 may have a value of approximately five milliohms. In addition, the current through Rs 305 may be monitored to determine whether the current has reached a threshold value. The threshold value may be calculated using certain circuit components within the power management framework 300 and may be adjusted according to the known impedance of the power cable, as will be discussed in further detail below.

In one implementation, Rs 305 may have a relatively low impedance value (e.g., five milliohms) and may therefore be associated with a relatively small signal or voltage. Thus, an operational amplifier (op-amp) 310 may also be coupled to Rs 305 in order to amplify or increase the voltage associated with Rs 305. In general, an op-amp 310 may receive two input voltages and produce a larger voltage (i.e., amplify the voltage) according to a certain ratio, called the gain. The gain may be any value and may be varied by adjusting the value and configuration of resistors R1 and R2. Thus, as applied to FIG. 3, the op-amp 310 may amplify the signal or voltage associated with the current through Rs 305 and deliver the signal as one input to a comparator 320.

As such, the output of the op-amp 310 may be coupled to an input of the comparator 320. Generally, a comparator may be operable to compare a first input voltage and a second input voltage. Depending on which input voltage is larger, the comparator 320 may typically provide a relatively high voltage (e.g., 5 volts), or a relatively low voltage (e.g., 0 volts) at its output. As illustrated in FIG. 3, the comparator 320 may have a fixed voltage (Vref) 315 at its inverting input, which corresponds to the first input voltage. The second input voltage, which may be the non-inverting input voltage, may receive the output of the op-amp 310. In addition, the non-inverting input voltage may be modified by the configuration and/or impedance values of resistors R3 and R4, as is generally known within the art. Therefore, the comparator 320 may compare its two input voltages, and depending on which input voltage is larger, Vref 315 or the non-inverting input, the comparator 320 may output a different voltage. In one implementation, the comparator may have a Vref 315 reference value of 2.5 Volts. According to the same implementation, the comparator 320 may output zero (0) volts if the non-inverting input is less than Vref and may output five (5) volts otherwise. According to this example, 0 volts may indicate an "OFF" signal while 5 volts may be associated with an "ON" signal.

Additionally, the output of the comparator 320 may be coupled to a resistor network 330. The resistor network 330 may include a MOSFET switch (Q1) 325 and a plurality of resistors R5, R6, R7, and R8. Notably, the configuration of the plurality of resistors in the resistor network 330 may define a reference voltage for the power supply or PWM controller. More specifically, the configuration may have direct implications regarding the output voltage 240 of the power management framework 300 as will be discussed below. As previously mentioned with reference to FIG. 2, the PWM controller may use the reference voltage to determine the needed output voltage 240 to account for a possible voltage drop along a power cable 250 from the power supply 205 to the IHS 5.

According to one implementation, the voltage drop may be calculated using a known impedance of a power cable and the current flowing through the power cable (i.e., the output current of the power supply). Generally, as the output current increases, the voltage drop along a power cable may also increase, thereby possibly necessitating a higher output voltage 240 from the power management framework 300. Therefore, by monitoring the current through Rs 305, the voltage drop along the power cable may be determined, and the reference voltage provided by the resistor network 330 may be adjusted for the PWM controller. Using the reference voltage, the PWM controller may direct the power supply to output an appropriate output voltage 240.

Thus, because the impedance of the power cable may already be a known value, the output current through Rs 305 may be the determining factor in calculating the voltage drop since the output current may fluctuate depending on the dynamic demands of the IHS 5. Thus, Rs 305 may be employed to monitor the output current. To this end, a threshold value may be set for the power management framework 300 to indicate that an adjustment to the output voltage 240 may be needed. As previously mentioned, the threshold value may also depend on the known impedance of the power cable. In one implementation, the threshold value may be represented by the formula:

$$ThresholdValue = \frac{Vref \cdot \left(\frac{R1}{R1+R2}\right) \cdot \left(\frac{R4+R3}{R4}\right) + \text{offset}}{Rs}.$$

As such, the threshold value may be adjusted by changing resistor values for Rs and R1-R4 according to the known impedance of the power cable. In addition, the offset value may depend on certain electrical characteristics of the op-amp 310 and may be listed in an associated datasheet.

Furthermore, as a function of the power management framework 300, the output voltage 240 may be adjusted depending on whether the output current through Rs 305 has reached the threshold value. In one implementation, if the output current has not reached the threshold value, the switch Q1 325 may be in an OFF state, and the resistor network 330 may be configured to provide a first reference voltage such that the power management framework 300 may produce a first output voltage 240. For example, in one implementation, while the output current remains below the threshold value, the first output voltage 240 may be represented by the formula:

$$Vout = \frac{Vref \cdot \left(\left(\frac{R7 \cdot R8}{R7+R8}\right) + R6 + R5\right)}{\frac{R7 \cdot R8}{R7+R8} + R6}.$$

On the other hand, if the output current reaches the threshold value, switch Q1 325 may be switched to an ON state by the comparator 320, and the configuration of the resistor network 330 may be adjusted to provide a second reference voltage that causes the power management framework 300 to produce a second output voltage 240. Under this scenario, the output voltage 240 may be represented by the formula:

$$Vout = \frac{Vref \cdot \left(\left(\frac{R7 \cdot R8}{R7+R8}\right) + R5\right)}{R7 \cdot R8}.$$

As shown by the formula, the configuration of the resistor network 330 may be adjusted such that R6 may no longer be used to calculate the output voltage 240. Thus, the power management framework 300 may provide two different output voltages depending on whether the output current has reached the threshold value in order to account for possible voltages drops.

In each of the two aforementioned scenarios, the voltage drop across a power cable and Rs may be calculated using the formula: VoltageDrop=$I_o \cdot (R_{cable}+Rs)$ where $I_o$ is the output current, $R_{cable}$ is the known impedance of the power cable, and Rs is the resistance of the sense resistor 305. Thus, in order to calculate the final voltage as experienced by the IHS 5, the voltage drop across the power cable may be subtracted from the output voltage 240 (Vout) of the power management framework 300. To this end, in order to meet the power requirements of the load or IHS, the resistor values in the resistor network may be adjusted accordingly such that the power management framework 300 provides an output voltage 240 that accounts for the voltage drop across a power cable.

It should be noted that the formulas discussed herein are merely examples of how to perform certain calculations and that the present disclosure is not limited to these specific formulas. As such, the threshold value for the output current may be determined using a different method and/or different formula. Similarly, the present disclosure is not limited to the specific configuration of the resistor network as depicted in FIG. 3. Indeed, many configurations of the resistor network 330 may be possible depending on the required output voltage 240 and/or requirements of the IHS 5. Furthermore, while FIG. 3 has been described with reference to a single threshold value for the output current, multiple threshold values are also possible. To this end, each threshold value may also be associated with separate adjustments of the reference voltage and/or output voltage 240. Further still, though reference has been made to the switch Q1 325 being in an OFF state while the output current is below the threshold value and in an ON state when the current is above the threshold value, the reverse may be true in other implementations.

Figure 4:
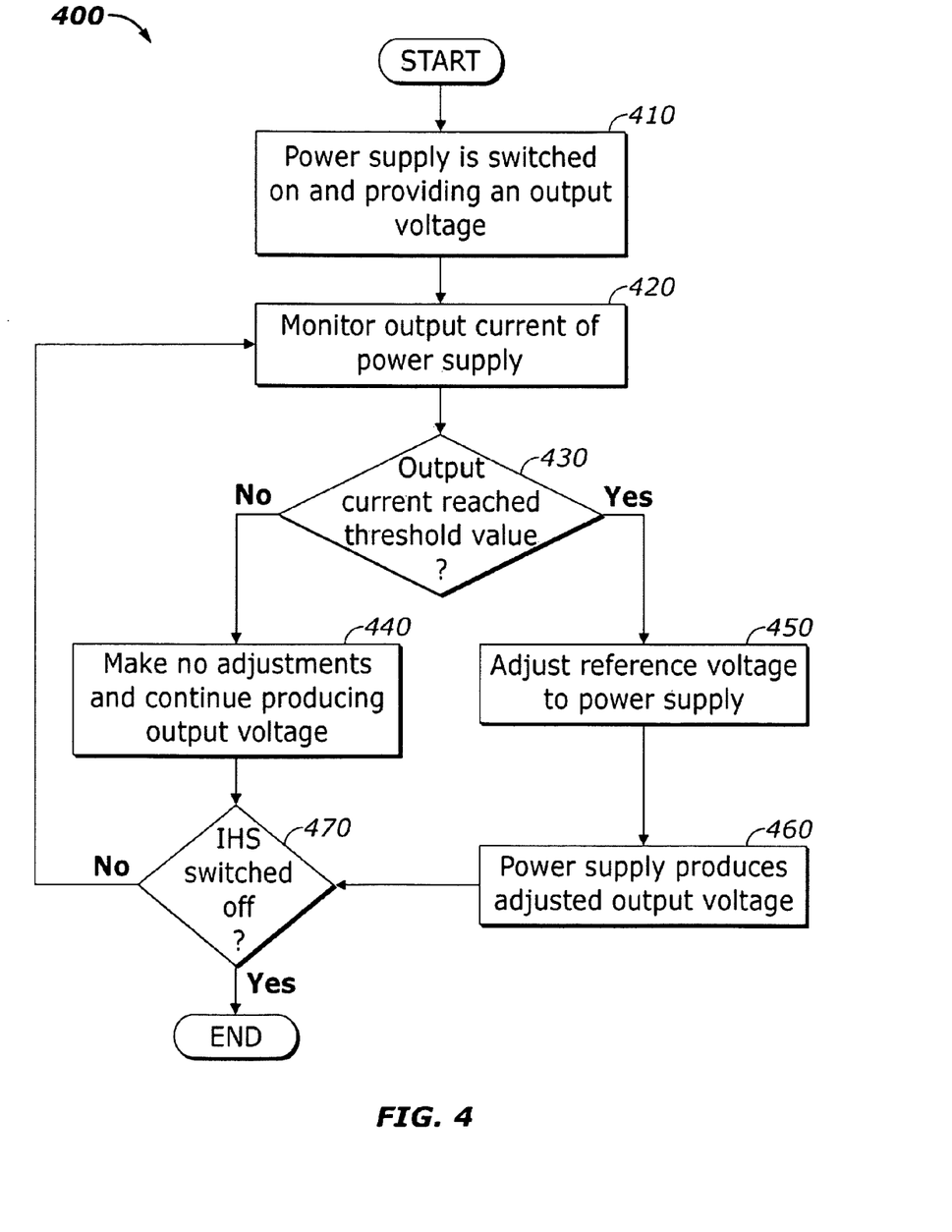
FIG. 4 provides a flow diagram illustrating a method for providing indirect voltage detection of an IHS in accordance with one aspect of the present disclosure.

Turning now to FIG. 4, a flow diagram is provided that illustrates a method, indicated generally at 400, for providing a power management framework in accordance with one aspect of the present disclosure. In step 410, a power supply may be switched to an ON state and may begin providing an output voltage to the IHS. The power supply may also provide an output current that may be monitored in step 420 with regard to a threshold value. As previously mentioned, using the output current of the power supply and a known impedance of the a power cable, a voltage drop across the power cable from the power supply to the IHS may be calculated. As such, the output voltage of the power supply may be adjusted to compensate for the voltage drop according to the output current.

To this end, the method may determine whether the output current has reached the threshold value, previously determined, in step 430. Notably, the output current may reach the threshold value in two ways: either falling to the threshold value from a relatively higher output current (in relation to the threshold value) or rising to the threshold value from a relatively lower output current. In step 440, if the output current has not reached the threshold value, no adjustments to the power management framework are made, and the method 400 may revert back to step 420 where the output current continues to be monitored.

On the other hand, if the output current has reached the threshold value, the reference voltage to the power supply may be adjusted in step 450. As previously mentioned with reference to FIG. 3, the configuration of the resistors in the resistor network may provide a reference voltage to the PWM controller. The PWM controller may then enable the power supply to adjust its output voltage in step 460 to account for the voltage drop associated with the output current at the threshold value. Depending on how the output current has reached the threshold value (i.e., from a higher current or lower current relative to the threshold value), the output voltage may be adjusted accordingly. Finally, though not pictured, the method 400 may end at any time when the power supply is switched off.

Thus, the present disclosure may disclose methods and systems for providing an indirect voltage detection for a load and/or IHS. Indeed, systems and methods of the present disclosure may monitor the output current of the power supply, determine the voltage drop from the output current and a known impedance of the power cable, and adjust the output voltage of the power supply appropriately to account for the voltage drop. In this manner, the present disclosure may adjust for voltage drops in a power cable without the need for extra feedback wires to/from a load back to the power supply. Therefore, thinner a thinner cable may be used to couple the power supply to the IHS, thereby increasing portability and improving aesthetics.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for providing indirect voltage detection in a power supply of an information handling system (IHS), the method comprising:
   providing an output current and an output voltage from the power supply to the IHS via a power cable;
   monitoring the output current at the power supply;
   adjusting the output voltage of the power supply if the output current reaches a threshold value dependent on the impedance of the power cable; and
   selecting more than one threshold value to provide multiple adjustments to the output voltage of the power supply.

2. The method of claim 1, wherein monitoring the output current is performed by a sense resistor in the power supply.

3. The method of claim 1, wherein the power supply comprises a configuration of resistors operable to determine the output voltage of the power supply.

4. The method of claim 1, wherein adjusting the output voltage comprises adjusting a configuration of resistors within the power supply.

5. The method of claim 1, wherein the power supply comprises a resistor network.

6. The method of claim 5, wherein the resistor network comprises:
   a switch configured between an ON state and an OFF state depending on whether the output current has reached the threshold value; and
   a plurality of resistors coupled to the switch, wherein a configuration of the plurality of resistors is operable to determine the output voltage.

7. The method of claim 6 further comprising adjusting the configuration of the plurality of resistors by switching the switch between the ON state and the OFF state.

8. A power management framework comprising:
   a power supply;
   a power supply cable of an impedance connecting the power supply to a load;
   a sense resistor operable to monitor an output current from the power supply to the load;
   a resistor network; and
   a controller coupled to the sense resistor and the resistor network, the controller operable to:
      adjust an output voltage of the power supply if the output current reaches a threshold value selected based on the impedance of the power cable; and
      select more than one threshold based on the impedance of the power cable.

9. The power management framework of claim 8, wherein the controller adjusts the output voltage by adjusting a configuration of resistors in the resistor network.

10. The power management framework of claim 8, wherein the resistor network comprises:
   a switch configured between an ON state and an OFF state depending on whether the output current has reached the threshold value; and
   a plurality of resistors coupled to the switch, wherein a configuration of the plurality of resistors is operable to determine the output voltage.

11. The power management framework of claim 10, wherein the switch is configured to an ON state if the output current is equal to or greater than the threshold value and configured to an OFF state if the output current is below the threshold value.

12. The power management framework of claim 10, wherein the switch is operable to adjust the configuration of the plurality of resistors by switching between the ON state and the OFF state.

13. A method for providing indirect voltage detection in a power supply, the method comprising:
- providing an output current and an output voltage from a power supply to an information handling system (IHS) via a power cable;
- calculating a voltage drop across the power cable by measuring the output current at the power supply and a known impedance of the power cable;
- adjusting the output voltage of the power supply if the output current reaches a threshold value dependent on the impedance of the power cable; and
- providing more than one threshold value for adjusting the output voltage of the power supply.

14. The method of claim 13, wherein the power supply comprises a resistor network.

15. The method of claim 13, wherein the resistor network comprises:
- a switch operable to switch between an ON state and an OFF state depending on whether the output current has reached the threshold value; and
- a plurality of resistors coupled to the switch, wherein a configuration of the plurality of resistors is operable to determine the output voltage.

16. The method of claim 15, wherein the switch is operable to adjust the configuration by switching between the ON state and the OFF state.

17. The method of claim 15, wherein adjusting the output voltage comprises adjusting the configuration of the plurality of resistors in the resistor network.

\* \* \* \* \*